(12) United States Patent
Lee et al.

(10) Patent No.: US 11,501,122 B2
(45) Date of Patent: Nov. 15, 2022

(54) AUTOMOTIVE SENSOR INTEGRATION MODULE

(71) Applicant: HYUNDAI MOBIS CO., LTD., Seoul (KR)

(72) Inventors: Sang Hun Lee, Yongin-si (KR); Seung Bum Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 324 days.

(21) Appl. No.: 16/726,756

(22) Filed: Dec. 24, 2019

(65) Prior Publication Data

US 2021/0125011 A1    Apr. 29, 2021

(30) Foreign Application Priority Data

Oct. 24, 2019  (KR) .................... 10-2019-0133132

(51) Int. Cl.
| | |
|---|---|
| *G06K 9/00* | (2022.01) |
| *G06K 9/62* | (2022.01) |
| *H04L 67/12* | (2022.01) |
| *H04Q 9/04* | (2006.01) |
| *G01S 13/931* | (2020.01) |
| *G01S 13/86* | (2006.01) |
| *G06V 20/58* | (2022.01) |

(52) U.S. Cl.
CPC .......... *G06K 9/6288* (2013.01); *G01S 13/865* (2013.01); *G01S 13/867* (2013.01); *G01S 13/931* (2013.01); *G06V 20/58* (2022.01); *H04L 67/12* (2013.01); *H04Q 9/04* (2013.01); *H04Q 2209/845* (2013.01)

(58) Field of Classification Search
CPC .... H04N 7/181; G11B 27/022; G11B 27/031; A63B 27/031; G06K 9/00342; G06K 9/00711; G06K 9/00724; G06T 7/20; G08B 21/043
USPC ............................................ 382/104; 342/99
See application file for complete search history.

(56) References Cited

U.S. PATENT DOCUMENTS

2019/0056476 A1*  2/2019  Lin .................... G01S 13/931

* cited by examiner

*Primary Examiner* — Phuoc H Doan
(74) *Attorney, Agent, or Firm* — H.C. Park & Associates, PLC

(57) ABSTRACT

An automotive sensor integration module including a plurality of sensors which differ in at least one of a sensing period or an output data format, an interface unit configured to receive pieces of detection data outputted from the plurality of sensors and convert the received detection data into a predetermined data format, and a signal processing unit configured to simultaneously output pieces of converted detection data from the interface unit on the basis of the sensing period of one among the plurality of sensors.

7 Claims, 5 Drawing Sheets

AUTOMOTIVE SENSOR INTEGRATION MODULE

CROSS-REFERENCE TO RELATED APPLICATION

This application claims priority from and the benefit of Korean Patent Application No. 10-2019-0133132, filed on Oct. 24, 2019, which is hereby incorporated by reference for all purposes as if set forth herein.

BACKGROUND

Field

Exemplary embodiments relate to an automotive sensor integration module.

Discussion of the Background

As technology becomes more advanced, various sensors, electronic devices, and the like are also provided in a vehicle for user convenience. In particular, research regarding an advanced driver assistance system (ADAS) has been actively conducted for users' driving convenience. Furthermore, the development of autonomous vehicles is actively under way.

The ADAS and the autonomous vehicles require a large number of sensors and electronic devices to identify objects outside a vehicle.

Referring to FIG. 1, in order to detect objects in front of a vehicle, a camera, a lidar, a radar sensor, etc. are disposed in front of the vehicle, but are disposed at different positions respectively.

Although objects should be identified on the basis of detection results detected by sensors at the same timing in order to improve performance in detecting objects, it becomes difficult to synchronize object detection sensors because the sensors are disposed at different positions.

The above information disclosed in this Background section is only for enhancement of understanding of the background of the invention and, therefore, it may contain information that does not constitute prior art.

SUMMARY

Exemplary embodiments of the present invention provide an automotive sensor integration module in which a plurality of synchronized sensors are arranged.

The inventive features are not limited to the above-mentioned exemplary embodiments, and other aspects and advantages of the present invention, which are not mentioned, will be understood through the following description, and will become apparent from the embodiments of the present invention. Furthermore, it will be understood that aspects and advantages of the present invention can be achieved by the means set forth in the claims and combinations thereof.

An exemplary embodiment of the present invention provides an automotive sensor integration module including a plurality of sensors which differ in at least one of a sensing period or an output data format, an interface unit configured to receive pieces of detection data outputted from the plurality of sensors and convert the received detection data into a predetermined data format, and a signal processing unit configured to simultaneously output pieces of converted detection data from the interface unit on the basis of the sensing period of one among the plurality of sensors.

The automotive sensor integration module may include a plurality of sensors including at least one of an optical camera, an infrared camera, a radar, or a lidar, and a circuit board in which the plurality of sensors are mounted.

Another exemplary embodiment of the present invention provides an automotive sensor integration module including one or more optical cameras, one or more infrared cameras, one or more radars, one or more lidars, and a circuit board in which the optical camera, the infrared camera, the radar, and the lidar are mounted. The automotive sensor integration module outputs, at the same timing, pieces of detection data outputted from the optical camera, the infrared camera, the radar, and the lidar on the basis of detection data outputted from the optical camera.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
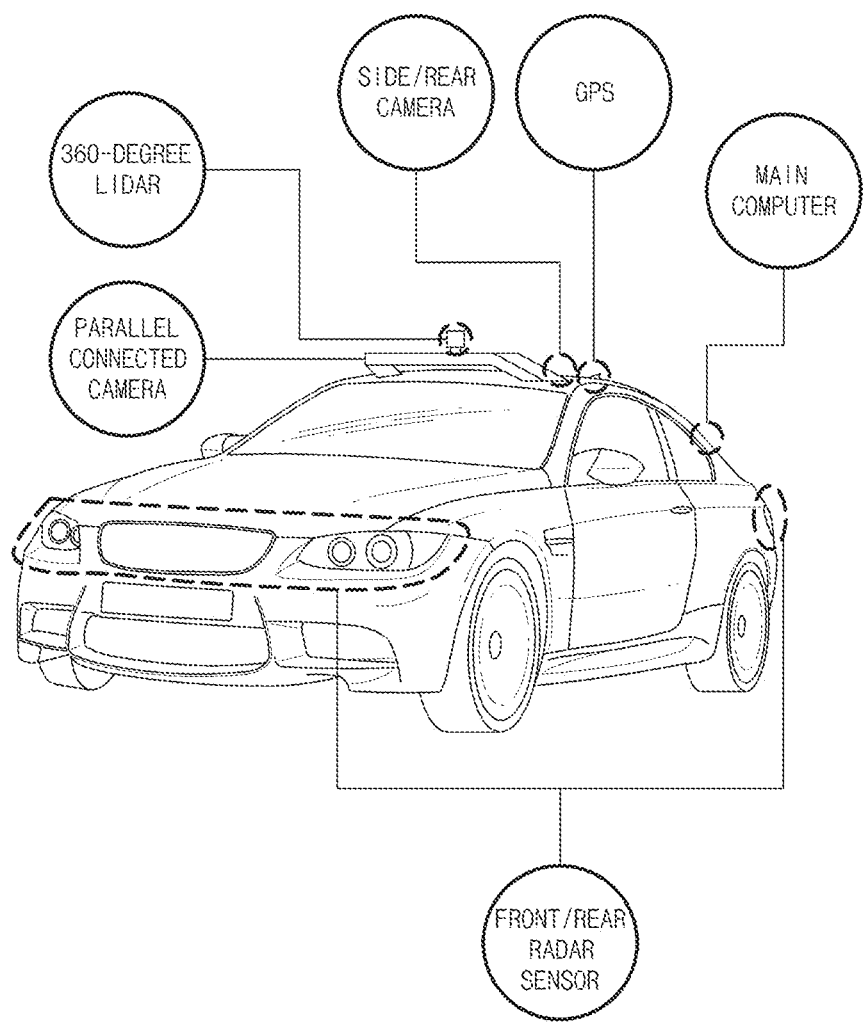
FIG. 1 is a diagram illustrating the external appearance of an autonomous vehicle.

Various advantages and features of the present invention and methods accomplishing thereof will become apparent from the following description of embodiments with reference to the accompanying drawings. However, the present invention is not to be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ).

Unless particularly described to the contrary, the term "comprise", "configure", "have", or the like, which are described herein, will be understood to imply the inclusion of the stated components, and therefore should be construed as including other components, and not the exclusion of any other elements.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts. Hereinafter, exemplary embodiments of the present invention will be described in more detail with reference to the accompanying drawings.

Figure 2:
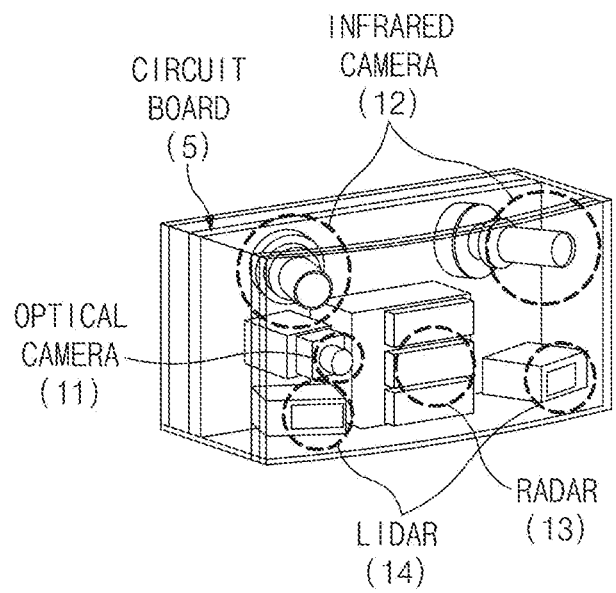
FIG. 2 is a diagram illustrating an external view of an automotive sensor integration module according to an exemplary embodiment of the present invention.

FIG. 2 is an outside view of an automotive sensor integration module according to an exemplary embodiment of the present invention.

An automotive sensor integration module according to an exemplary embodiment of the present invention may include a plurality of devices and sensors for detecting objects outside a vehicle to acquire safety information related to vehicle driving. In this case, the objects may include a lane, another vehicle, a pedestrian, a two-wheeled vehicle, a traffic signal, light, a road, a structure, a speed bump, a geographical feature, an animal, etc.

The lane may be a driving lane, a lane next to the driving lane, or a lane in which a vehicle is driving in the opposite direction. The lane may include left and right lines forming a lane.

Another vehicle may be a vehicle that is traveling in the vicinity of a host vehicle. The other vehicle may be a vehicle within a predetermined distance from the host vehicle. For example, the other vehicle may be a vehicle that is located within a predetermined distance from the host vehicle and precedes or follows the host vehicle.

The pedestrian may be a person in the vicinity of a host vehicle. The pedestrian may be a person located within a predetermined distance from the host vehicle. For example, the pedestrian may be a person on a sidewalk or the roadway within a predetermined distance from the host vehicle.

The two-wheeled vehicle may be a vehicle that is located in the vicinity of a host vehicle and moves using two wheels. The two-wheeled vehicle may be a vehicle that has two wheels and is located within a predetermined distance from the host vehicle. For example, the two-wheeled vehicle may include a motorcycle or a bicycle on a sidewalk or the roadway within a predetermined distance from the vehicle.

The traffic signal may include a traffic light, a traffic sign, or a pattern or text drawn on a road surface.

The light may include light from a lamp in another vehicle, light from a street lamp, or light emitted from the sun.

The road may include a road surface, a curve, and a slope, such as an upward slope and a downward slope.

The structure may be an object which is located around the road and fixed onto the ground. For example, the structure may include a streetlight, a roadside tree, a building, a power pole, a traffic light, a bridge, etc.

The geographical feature may include a mountain, a hill, etc.

Meanwhile, the objects may be classified into a moving object and a stationary object. For example, the moving object may conceptually include another vehicle, a two-wheeled vehicle, a pedestrian, etc., while the stationary object may conceptually include a traffic signal, a road, a structure, etc.

As such, it may be desirable to use various sensors and devices to accurately identify various objects around a vehicle.

In order to accurately identify objects outside a vehicle, an automotive sensor integration module 100 according to an exemplary embodiment of the present invention may include a plurality of different types of sensors and devices. In addition, the automotive sensor integration module 100 according to an exemplary embodiment of the present invention may include at least one sensor and device of the same type.

Figure 3:
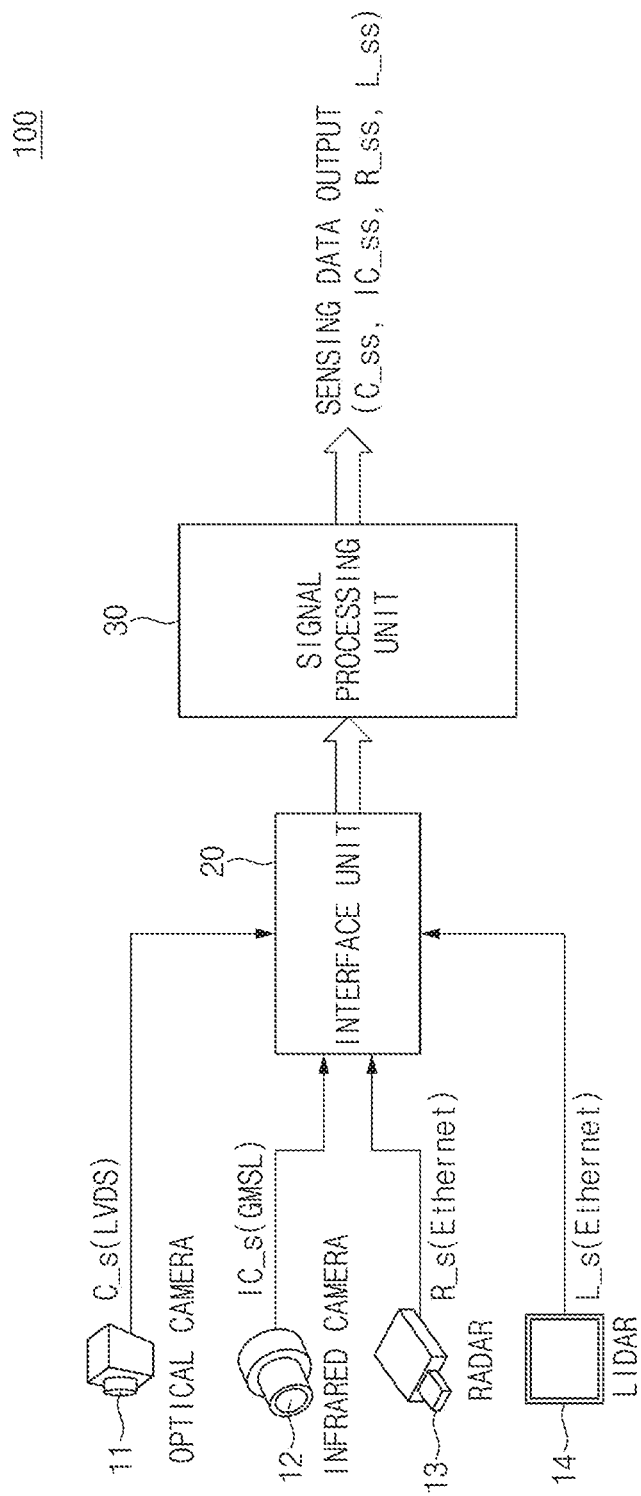
FIG. 3 is a diagram illustrating a configuration of an automotive sensor integration module according to an exemplary embodiment of the present invention.

Referring to FIGS. 2 and 3, the automotive sensor integration module 100 according to an exemplary embodiment of the present invention may include an infrared camera 12, an optical camera 11, a lidar 14, and a radar 13 as a sensor to identify an object outside a vehicle. The automotive sensor integration module 100 according to an exemplary embodiment of the present invention illustrated in FIGS. 2 and 3 is exemplarily shown to include an infrared camera 12, an optical camera 11, a lidar 14, and a radar 13 as a sensor in order to identify an object, but is not limited thereto. In addition, the automotive sensor integration module 100 according to an exemplary embodiment of the present invention illustrated in FIGS. 2 and 3 shows two infrared cameras 12, one optical camera 11, two lidars 14, and one radar 13, but the number of each sensor is suggested only for illustrative purposes and is not limited thereto.

Referring to FIGS. 2 and 3, the automotive sensor integration module 100 according to an exemplary embodiment of the present invention may include a circuit board 5, an infrared camera 12, an optical camera 11, a radar 13, and a lidar 14. For example, the automotive sensor integration module 100 according to an exemplary embodiment of the present invention may include a circuit board 5 on which an infrared camera 12, an optical camera 11, a radar 13, and a lidar 14 are disposed and mounted.

The optical camera 11 designed to acquire outside images of a vehicle through light and recognize objects, light, and people around the vehicle may include a mono camera, a stereo camera, an around view monitoring (AVM) camera, and a 360-degree camera. The optical camera 11 has advantages of being able to detect colors and accurately classify objects compared to other sensors, but has a disadvantage of being affected by environmental factors, such as darkness, backlight, snow, rain, fog, etc.

The radar 13 may detect an object on the basis of a time-of-flight (TOF) method or a phase-shift method through electromagnetic waves, and detect the location of a detected object, the distance to the detected object, and the relative speed. The radar 13 has an advantage of being capable of long distance detection without being affected by environmental factors, such as darkness, snow, rain, fog, etc., but has a disadvantage of failing to detect an object, made of an electromagnetic wave-absorbing material, for example, a steel structure, such as a tunnel or a guardrail, and thus, being unable to classify objects.

The lidar 14 may detect an object on the basis of a TOF method or a phase-shift method through laser light, and detect the location of a detected object, the distance to the detected object, and the relative speed. The lidar 14 has advantages of being less affected by environmental factors such as darkness, snow, rain, fog, etc., efficient in long- and short-distance detection due to high resolution, and objects are able to be simply classified, but has a disadvantage of failing to measure the speed of objects immediately.

The infrared camera 12 may acquire outside images of a vehicle through infrared rays. In particular, the infrared camera 12 may acquire outside images of the vehicle even in darkness at night. The infrared camera 12 has advantages of being capable of long distance detection and being capable of distinguishing living things from objects without being affected by environmental factors such as darkness, snow, rain, fog, etc. but has a disadvantage of being expensive.

As such, in order to accurately classify and identify external objects around a vehicle regardless of environmental factors, the advantages and disadvantages of each sensor must be combined. Therefore, the automotive sensor integration module 100 according to an exemplary embodiment of the present invention discloses a structure in which a plurality of different sensors are all disposed and mounted on a circuit board 5. In addition, the automotive sensor integration module 100 according to an exemplary embodiment of the present invention may synchronize and output detection results of a plurality of sensors having different operation cycles, thereby having an advantage of classifying and identifying objects more accurately.

FIG. 3 is a diagram illustrating a configuration of an automotive sensor integration module 100 according to an exemplary embodiment of the present invention.

Referring to FIG. 3, an automotive sensor integration module 100 according to an exemplary embodiment of the present invention may include an optical camera 11, an infrared camera 12, a radar 13, a lidar 14, an interface unit 20, and a signal processing unit 30. In this case, the interface unit 20 and the signal processing unit 30 may be implemented as hardware or software on the circuit board shown in FIG. 2.

The optical camera 11 may output information detected by medium of light as the first detection data C_s.

The infrared camera 12 may output information detected by medium of infrared light as the second detection data IC_s.

The radar 13 may output information detected by medium of electromagnetic waves as the third detection data R_s.

The lidar 14 may output information detected by medium of laser light as the fourth detection data L_s.

In this case, communication standards of the detection data C_s, IC_s, R_s, and L_s outputted by the optical camera 11, the infrared camera 12, the radar 13, and the lidar 14 may be different. For example, the first detection data C_s outputted by the optical camera 11 may be data of a format used in Low Voltage Differential Signal (LVDS) communication. The second detection data IC_s outputted by the infrared camera 12 may be data of a format used in Gigabit Multimedia Serial Link (GMSL) communication. The radar 13 and the lidar 14 may be data of a format used in Ethernet.

The interface unit 20 may convert the first-to-fourth detection data C_s, IC_s, R_s, and L_s, the data formats of which have been converted into one preset data format. The interface unit 20 may convert the first-to-fourth detection data C_s, IC_s, R_s, and L_s, the data formats of which have been converted into one preset data format. In this case, the vehicle network communication technology may include Controller Area Network (CAN) communication, Local Interconnect Network (LIN) communication, Flex-Ray® communication, Ethernet, and so on. For example, the interface unit 20 may convert the first-to-fourth detection data C_s, IC_s, R_s, and L_s into data of a format according to Ethernet communication.

The signal processing unit 30 may receive the first-to-fourth detection data C_s, IC_s, R_s, and L_s of the same format converted by the interface unit 20. The signal processing unit 30 may synchronize the first-to-fourth detection data C_s, IC_s, R_s, and L_s of the same format outputted from the interface unit 20 to a preset timing and output the detection data to the outside of the automotive sensor integration module 100 as the first-to-fourth sensing data C_ss, IC_ss, R_ss, and L_ss. For example, the signal processing unit 30 may output the first-to-fourth detection data C_s, IC_s, R_s, and L_s as the first-to-fourth sensing data C_ss, IC_ss, R_ss, and L_ss at the same timing on the basis of the input timing of one of the first-to-fourth detection data C_s, IC_s, R_s, and L_s. For a more detailed example, the signal processing unit 30 may be configured to receive and store the first-to-fourth detection data C_s, IC_s, R_s, and L_s, and if a predetermined time elapses after the third detection data R_s is inputted to the signal processing unit 30, output the stored first-to-fourth detection data C_s, IC_s, R_s, and L_s as the first-to-fourth sensing data C_ss, IC_ss, R_ss, and L_ss.

Figure 4:
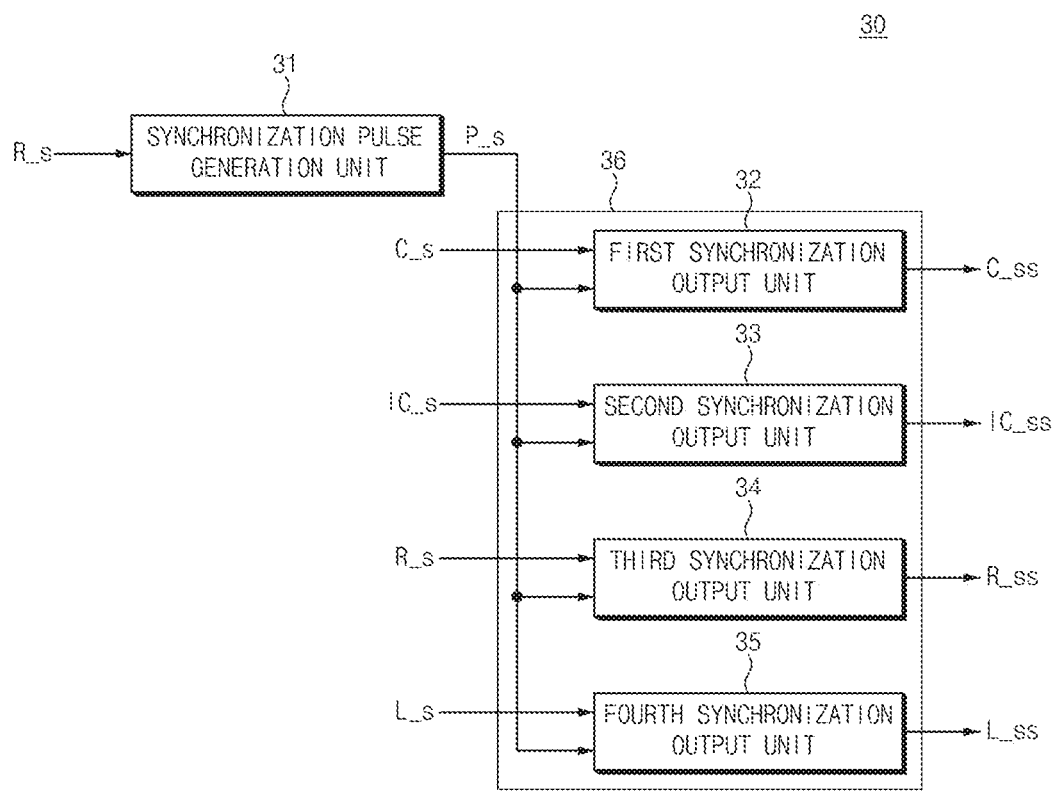
FIG. 4 is a diagram illustrating a configuration of a signal processing unit of FIG. 3.

FIG. 4 is a diagram illustrating a configuration of the signal processing unit of FIG. 3.

Referring to FIG. 4, the signal processing unit 30 may include a synchronization pulse generation unit 31 and an output synchronization unit 36. In this case, the signal processing unit 30 may receive the converted first-to-fourth detection data C_s, IC_s, R_s, and L_s from the interface unit 20.

Hereinafter, in the description of the signal processing unit 30, the first-to-fourth detection data C_s, IC_s, R_s, and L_s, the data formats of which have been converted by the interface unit 20, are simply referred to as the first-to-fourth detection data C_s, IC_s, R_s, and L_s for convenience, but it should be noted that the first-to-fourth detection data C_s, IC_s, R_s, and L_s respectively inputted to the synchronization pulse generation unit 31 and the first-to-fourth synchronization output units 32, 33, 34, and 35 constituting the signal processing unit 30 are data, the formats of which have been converted by the interface unit 20.

The synchronization pulse generation unit 31 may receive the third detection data R_s and output a synchronization pulse P_s. The synchronization pulse generation unit 31 may generate and output the synchronization pulse P_s on the basis of the third detection data R_s. For example, the synchronization pulse generation unit 31 may generate and output the synchronization pulse P_s when a predetermined time has elapsed after the third detection data R_s was inputted.

The output synchronization unit 36 may receive the first-to-fourth detection data C_s, IC_s, R_s, and L_s and the synchronization pulse P_s, and outputs the first-to-fourth sensing data C_ss, IC_ss, R_ss, and L_ss. For example, the output synchronization unit 36 may receive and store the converted first-to-fourth detection data C_s, IC_s, R_s, and L_s provided from the interface unit 20 and according to the synchronization pulse P_s, output the stored first-to-fourth detection data C_s, IC_s, R_s, and L_s as the first-to-fourth sensing data C_ss, IC_ss, R_ss, and L_ss.

The output synchronization unit 36 may include a first synchronization output unit 32, a second synchronization output unit 33, a third synchronization output unit 34, and a fourth synchronization output unit 35.

The first synchronization output unit 32 may receive the first detection data C_s and the synchronization pulse P_s and output the first sensing data C_ss. For example, the first synchronization output unit 32 may receive and store the first detection data C_s and output the stored first detection data C_s as the first sensing data C_ss on the basis of the synchronization pulse P_s. In more detail, the first synchronization output unit 32 may receive and store the first detection data C_s and output the stored first detection data C_s as the first sensing data C_ss when the synchronization pulse P_s is inputted.

The second synchronization output unit 33 may receive the second detection data IC_s and the synchronization pulse P_s and output the second sensing data IC_ss. For example, the second synchronization output unit 33 may receive and store the second detection data IC_s and output the stored second detection data IC_s as the second sensing data IC_ss on the basis of the synchronization pulse P_s. In more detail, the second synchronization output unit 33 may receive and store the second detection data IC_s and output the stored second detection data IC_s as the second sensing data IC_ss when the synchronization pulse P_s is inputted.

The third synchronization output unit 34 may receive the third detection data R_s and the synchronization pulse P_s and output the third sensing data R_ss. For example, the third synchronization output unit 34 may receive and store the third detection data R_s, and output the stored third detection data R_s as the third sensing data R_ss on the basis of the synchronization pulse P_s. In more detail, the third synchronization output unit 34 may receive and store the third detection data R_s, and may output the stored third detection data R_s as the third sensing data R_ss when the synchronization pulse P_s is inputted.

The fourth synchronization output unit 35 may receive the fourth detection data L_s and the synchronization pulse P_s and output the fourth sensing data L_ss. For example, the fourth synchronization output unit 35 may receive and store the fourth detection data L_s, and output the stored fourth detection data L_s as the fourth sensing data L_ss on the basis of the synchronization pulse P_s. In more detail, the fourth synchronization output unit 35 may receive and store the fourth detection data L_s, and may output the stored fourth detection data L_s as the fourth sensing data L_ss when the synchronization pulse P_s is inputted.

In this case, each of the first-to-fourth synchronization output units 32, 33, 34, and 35 may include a register. The automotive sensor integration module 100 according to an exemplary embodiment of the present invention is briefly described as follows.

As shown in FIG. 3, the automotive sensor integration module 100 according to an exemplary embodiment of the present invention may include a plurality of sensors for detecting an object outside a vehicle, and the plurality of sensors may include an optical camera 11, an infrared camera 12, a radar 13, and a lidar 14. Sensors with different media that detect objects may output the detection results as data in different communication formats. Therefore, the automotive sensor integration module 100 according to an exemplary embodiment of the present invention includes the interface unit 20 to convert the detection results of the sensors, which are outputted as data in different communication formats, into data according to one preset communication format.

In addition, the optical camera 11, the infrared camera 12, the radar 13, and the lidar 14 may have different sensing (or operating) periods. For example, the optical camera 11 and the infrared camera 12 may have a sensing period of 30 Hz, and the radar 13 may have a sensing period of 20 Hz, and the lidar 14 may have a sensing period of 10 Hz. Accordingly, the optical camera 11 and the infrared camera 12 may output the first and second detection data C_s and IC_s every first time (33 ms), and the radar 13 may output the third detection data R_s every second time (50 ms), and the lidar 14 may output the fourth detection data L_s every third time (100 ms).

In order to accurately identify an object located outside the vehicle, detection data detected at the same time from the optical camera 11, the infrared camera 12, the radar 13, and the lidar 14 are required. However, as described above, each of the optical camera 11, the infrared camera 12, the radar 13, and the lidar 14 has a different sensing period, and thus, it may be difficult to identify an object.

The automotive sensor integration module 100 according to an exemplary embodiment of the present invention includes a signal processing unit 30 so that the detection data of the optical camera 11, the infrared camera 12, the radar 13, and the lidar 14 may be synchronized and outputted on the basis of the sensing period of one of the optical camera 11, the infrared camera 12, the radar 13, and the lidar 14. Therefore, the automotive sensor integration module 100 according to an exemplary embodiment of the present invention is advantageous for identifying an object located outside the vehicle.

Figure 5:
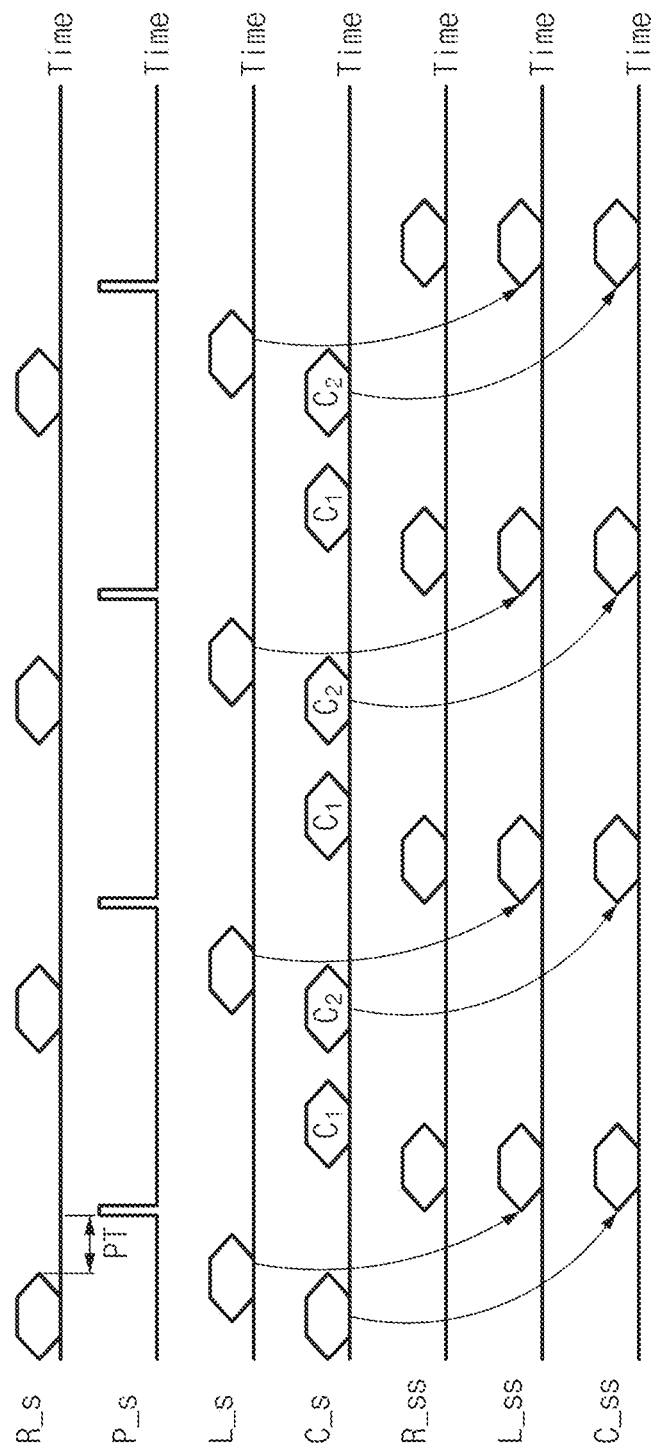
FIG. 5 is a timing diagram illustrating an operation of an automotive sensor integration module according to an exemplary embodiment of the present invention.

FIG. 5 is a timing diagram illustrating an operation of an automotive sensor integration module according to an exemplary embodiment of the present invention. In this case, FIG. 5 illustrates a timing diagram in which the detection data C_s, R_s and L_s of the optical camera 11, the radar 13, and the lidar 14 among the optical camera 11, the infrared camera 12, the radar 13, and the lidar 14 shown in FIG. 3 are inputted to or stored in the signal processing unit 30 and outputted as the sensing data C_ss, R_ss, and L_ss. For example, by using the example that the infrared camera 12 has the same sensing period as that of the optical camera 11, the description of the synchronization operation of the detection data IC_s of the infrared camera 12 is replaced with that of the detection data C_s outputted from the optical camera 11.

The automotive sensor integration module 100 according to an exemplary embodiment of the present invention using a configuration for synchronizing and outputting the detection data of the optical camera 11, the infrared camera 12, the radar 13, and the lidar 14 on the basis of the sensing period of the radar 13 among the optical camera 11, the infrared camera 12, the radar 13, and the lidar 14 as an example is shown in FIG. 5.

Referring to FIGS. 4 and 5, the operation of the automotive sensor integration module 100 according to an exemplary embodiment of the present invention is described as follows.

The signal processing unit 30 configured in the automotive sensor communication module 100 may include a synchronization pulse generation unit 31 and an output synchronization unit 36, and as described above, the output synchronization unit 36 may include first-to-fourth synchronization output units 32, 33, 34, and 35.

The synchronization pulse generation unit 31 may generate and output the synchronization pulse P_s when a predetermined time has elapsed after the third detection data R_s was inputted from the radar 13.

Thus, as shown in FIG. 5, the synchronization pulse P_s is generated each time when a predetermined time has elapsed after the third detection data R_s was inputted to the synchronization pulse generation unit 31 of the signal processing unit 30 and.

The first detection data C_s, the third detection data R_s, and the fourth detection data L_s respectively outputted from the optical camera 11, the radar 13, and the lidar 14 are respectively stored in the first synchronization output unit 32, the third synchronization output unit 34, and the fourth synchronization output unit 35.

The first-to-fourth synchronization output units 32, 33, 34, and 35 respectively store the inputted data and output the stored data as sensing data C_ss, R_ss, L_ss, and IC_ss on the basis of the synchronization pulse P_s.

Accordingly, as shown in FIG. 5, at the timing at which the synchronization pulse P_s is generated, the first-to-fourth synchronization output units 32, 33, 34, and 35 respectively output the stored detection data as the sensing data C_ss, IC_ss, R_ss, and L_ss. In this case, the optical camera 11 may obtain two pieces of first detection data C_s (C1 and C2) during one period of the third detection data R_s outputted from the radar 13, and output the detection data to the interface unit 20 and the signal processing unit 30. In this case, the automotive sensor integration module 100 according to an exemplary embodiment of the present invention may output the first detection data C_s (C2), among the two pieces of first detection data C_s (C1 and C2), obtained or outputted from the optical camera 11 as the sensing data C_ss at the timing closest to that of the third detection data R_s outputted from the radar 13.

The automotive sensor integration module 100 according to an exemplary embodiment of the present invention may store the first-to-fourth detection data C_s, IC_s, R_s, and L_s, and output the stored detection data C_s, IC_s, R_s, and L_s on the basis of the synchronization pulse P_s according to any one (e.g., the third detection data R_s in FIG. 5) among the first-to-fourth detection data C_s, IC_s, R_s, and L_s.

When a plurality of pieces of detection data (e.g., the first detection data C_s (C1 and C2) in FIG. 5) are generated for a specific sensor during one period of the synchronization pulse P_s, the detection data (e.g., the first detection data C_s (C2) in FIG. 5) obtained or stored at the timing closest to that of the detection data (e.g., the third detection data R_s in FIG. 5) that becomes the reference of the synchronization pulse P_s, which is an output timing, may be outputted as sensing data.

The automotive sensor integration module according to the present invention may include a plurality of sensors having different sensing periods and output data formats, convert the output data format of each sensor to a specific data format (for example, a single data format), and synchronize and output data detected by the plurality of sensors on the basis of a sensing period of one of the plurality of sensors.

Therefore, the ADAS or autonomous vehicle to which the automotive sensor integration module according to the present invention is applied is advantageous in object discrimination than the ADAS or autonomous vehicle in which each sensor is separated and disposed at different positions.

In relation to the automotive sensor integration module according to an embodiment of the present invention, since a plurality of sensors are synchronized to operate, the performance of detecting objects outside the vehicle is improved.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An automotive sensor integration module comprising:
a plurality of sensors differing from each other in at least one of a sensing period or an output data format;
an interface unit configured to receive pieces of detection data outputted from the plurality of sensors and convert the received detection data into a predetermined data format; and
a signal processor configured to simultaneously output pieces of converted detection data from the interface unit on the basis of the sensing period of one among the plurality of sensors,
wherein the signal processing unit receives and stores the pieces of converted detection data and simultaneously outputs the pieces of stored detection data on the basis of the sensing period of one among the plurality of sensors.

2. The automotive sensor integration module of claim 1, wherein the plurality of sensors, the interface unit, and the signal processing unit are mounted on at least one circuit board.

3. The automotive sensor integration module of claim 1, wherein the signal processing unit comprises:
a synchronization pulse generation unit configured to generate a synchronization pulse on the basis of the sensing period of one among the plurality of sensors, and
an output synchronization unit configured to store the pieces of converted detection data, and output the pieces of stored detection data when the synchronization pulse is inputted.

4. The automotive sensor integration module of claim 1, wherein the plurality of sensors are configured to detect an object located outside a vehicle.

5. The automotive sensor integration module of claim 4, wherein the plurality of sensors comprise at least one of an optical camera, an infrared camera, a radar, and a lidar.

6. The automotive sensor integration module of claim 5, wherein at least one of the optical camera, the infrared camera, the radar, or the lidar is mounted on one or more circuit boards.

7. The automotive sensor integration module of claim 6, wherein at least one of the optical camera, at least one of the infrared camera, at least one of the radar, and at least one of the lidar are mounted on one of the circuit boards.

* * * * *